United States Patent
Li et al.

(10) Patent No.: US 10,949,582 B2
(45) Date of Patent: Mar. 16, 2021

(54) CLASSIFICATION OPTIMIZATION METHOD FOR STEEL GRADE FAMILY OF STEEL ROLLING MODEL

(71) Applicant: WUHAN UNIVERSITY OF SCIENCE AND TECHNOLOGY, Hubei (CN)

(72) Inventors: Weigang Li, Hubei (CN); Wei Ma, Hubei (CN); Wensheng Xu, Hubei (CN); Yuntao Zhao, Hubei (CN)

(73) Assignee: WUHAN UNIVERSITY OF SCIENCE AND TECHNOLOGY, Hubei (CN)

( * ) Notice: Subject to any disclaimer, the term of this patent is extended or adjusted under 35 U.S.C. 154(b) by 290 days.

(21) Appl. No.: 16/261,527

(22) Filed: Jan. 29, 2019

(65) Prior Publication Data

US 2019/0377841 A1 Dec. 12, 2019

(30) Foreign Application Priority Data

Jun. 6, 2018 (CN) .......................... 201810574041.X

(51) Int. Cl.
*G06F 30/20* (2020.01)
*G06F 17/10* (2006.01)
*G06F 111/10* (2020.01)

(52) U.S. Cl.
CPC .............. *G06F 30/20* (2020.01); *G06F 17/10* (2013.01); *G06F 2111/10* (2020.01)

(58) Field of Classification Search
None
See application file for complete search history.

(56) References Cited

U.S. PATENT DOCUMENTS

| 2016/0161382 | A1* | 6/2016 | Yonemura | G06F 30/20 |
| | | | | 73/851 |
| 2018/0232472 | A1* | 8/2018 | Desmeure | G06F 30/15 |
| 2019/0050504 | A1* | 2/2019 | Zhu | G06F 30/23 |

OTHER PUBLICATIONS

Li et al., "Optimization for steel grade family of model based on measured data during hot continuous rolling", Iron and Steel, Oct. 2018, pp. 56-62.

* cited by examiner

*Primary Examiner* — Steven M Christopher
(74) *Attorney, Agent, or Firm* — JCIPRNET

(57) ABSTRACT

Provided is a classification optimization method for steel grade family of a steel rolling model, including: step 1: calculating the deformation rate and deformation resistance of a rolled piece according to rolling process data; step 2: reversing the "equivalently measured" deformation resistance according to the measured roll force; step 3: drawing a scatter plot of data on a graph, and judging whether layer division is reasonable according to distribution characteristics; and step 4: for the unreasonable division of steel grade family, optimizing the existing classification of steel grade family using a new algorithm called line clustering, determining steel grade codes that need to be divided into new family, searching for the shortest distance from a sample point to the curve of each cluster centre based on a Nelder-Mead algorithm, dividing all data points into k subsets according to the principle of proximity, fitting a power curve to each data subset using a least square method, repeating the above steps, and stopping iterating when cluster centrelines obtained by two successive iterations are consistent. The present invention improves the precision of the division of steel grade family of a hot rolled model.

2 Claims, 4 Drawing Sheets

CLASSIFICATION OPTIMIZATION METHOD FOR STEEL GRADE FAMILY OF STEEL ROLLING MODEL

CROSS-REFERENCE TO RELATED APPLICATION

This application claims the priority benefit of China application serial no. 201810574041.X, filed on Jun. 6, 2018. The entirety of the above-mentioned patent application is hereby incorporated by reference herein and made a part of this specification.

BACKGROUND OF THE INVENTION

1. Field of the Invention

The present invention relates to a classification optimization method for steel grade family of a steel rolling model, which belongs to the field of control over a rolling process of hot rolled strip.

2. Description of Related Art

During the production process of hot rolled strip, a steel grade family is one of the most important basic configuration data of a hot continuous rolling process control model, which is the most basic index number of thermophysical parameters, process parameters, model parameters and adaptive parameters and has an important influence on rolling process control. The traditional division of steel grade family is mainly determined by carbon equivalent and manual experience. The traditional method can make a reasonable distinction between the main categories of steel hardness, but the difference in hardness between different steel grade codes (one steel grade code corresponding to a specific steel grade) in the same main category cannot be carefully distinguished, and an unreasonable situation often occurs. Either the steel grade codes which should be separated are classified as one family or are over-subdivided, resulting in a significant reduction in the adaptive effect of a rolling model. Especially when the steel grade family of the current strip is different with the one of the previous strip, the problems are prominent, and the model setting precision is significantly reduced, which affects the roll gap setting and rolling stability of a rolling mill. In order to more accurately classify the steel grade family, a more efficient classification method is needed.

SUMMARY OF THE INVENTION

The present invention is directed to a classification optimization method for steel grade family of a steel rolling model, intended to solve the above problem.

The present invention adopts the following technical solution.

A classification optimization method for steel grade family of a steel rolling model is characterized by including:

step 1: for each coil of strip in a steel grade family, calculating a deformation rate Ż and deformation resistance $Km^{POS}$ of a rolled piece according to latest rolling process measured data obtained during model adaptive post-calculation process, calculation formulas for the deformation rate being as follows:

$$\varepsilon = \ln\left(\frac{1}{1-r}\right) = \ln\left(\frac{H}{h}\right)$$

$$\dot{\varepsilon} = \frac{\varepsilon \cdot v_R}{\sqrt{R' \cdot (H-h)}}$$

where $\varepsilon$ is the deformation degree of the rolled piece, $\dot{\varepsilon}$ is the deformation rate of the rolled piece, r is the reduction rate of a stand, H and h are the entry thickness and exit thickness of the rolled piece on a stand respectively, $v_R$ is a measured speed of rolls, and R' is a roll flattening radius, a calculation formula for the deformation resistance being as follows:

$$Km^{POS} = \left(a_0 + \sum_{i=1}^{n} a_i \cdot x_i\right) \cdot \exp\left(\frac{b_1}{T+273}\right) \cdot \varepsilon^{b_2} \cdot \dot{\varepsilon}^{b_3}$$

where $Km^{POS}$ is a calculated value of the deformation resistance of the rolled piece, T is a rolling deformation temperature, $x_i$ is the content of each chemical component of strip, and $a_i$ and $b_i$ are model undetermined parameters;

step 2: for each coil of hot rolled strip, substituting a measurement value of roll force according to roll force model calculation formulas, and reversely obtaining the deformation resistance $Km^{ACT}$ of the rolled piece, the calculation formulas being as follows:

$$Km^{ACT} = \frac{F^{ACT}}{W^{ACT} \cdot L_d^{ACT} \cdot Q_p^{ACT}} + \alpha_b \cdot T_b^{ACT} + \alpha_f \cdot T_f^{ACT}$$

$$L_d^{ACT} = \sqrt{R' \Delta h}$$

$$Q_p^{ACT} = (a_{F1} + a_{F2} \cdot r) + (a_{F3} + a_{F4} \cdot r + a_{F5} \cdot r^2) \cdot \sqrt{\frac{R'}{h}}$$

$$R' = \left(1 + \frac{16 \cdot (1-v^2)}{\pi \cdot E} \cdot \frac{F_{act} \cdot 1000}{W^{ACT} \cdot \Delta h}\right) \cdot R$$

where $Km^{ACT}$ is a "measurement" value of the deformation resistance of the rolled piece, $F^{ACT}$ is a measured roll force, $W^{ACT}$ is a measured strip width, $L_d^{ACT}$ is a roll flattening arc length, $Q_p^{ACT}$ is a stress state coefficient, $T_b^{ACT}$ is a measured backward tension, $T_f^{ACT}$ is a measured forward tension, $\alpha^b$ and $\alpha^f$ are tension influence coefficients, $\alpha_{Fi}$ is a model parameter, v is a Poisson's coefficient, E is an elasticity modulus, $\Delta h$ is a rolling reduction, and R is a roll original radius;

step 3: drawing a scatter plot of data ($\dot{\varepsilon}$, $Km^{POS}$) and ($\dot{\varepsilon}$, $Km^{ACT}$) on the same graph, according to strip distribution characteristics of data scatters: if the data scatters are concentrated within a strip-shaped range, the division of steel grade family is more reasonable; if they are scattered into several strip-shaped distributions segmented obviously, the division of steel grade family is unreasonable, and the layer needs to be further subdivided; and step 4: for the unreasonable division of steel grade family, optimizing the existing classification of steel grade family using a new algorithm called line clustering, and determining steel grade code that need to be divided into a new family;

(1) randomly initializing k curves as cluster centres within the range of a data set, wherein randomly initializing k curves refers to randomly selecting k groups of C and m coefficient values according to a relationship $Km=C \cdot \dot{\varepsilon}m$ in a deformation resistance data set;

(2) calculating the distance from all sample points to the k cluster centrelines $Km_{cenj}=C_j \cdot \dot{\varepsilon}^{mj}$, for each sample point, finding a cluster centreline closest to the sample point, adding the sample point into a cluster corresponding to the cluster centreline closest to the sample point, and dividing the whole data set into k clusters after traversing all the sample points; and (3) fitting power curves to data subsets of the k clusters using a least square method respectively, updating the C and m coefficient values to update each cluster centreline, repeating step (2), and stopping iterating when the cluster centrelines obtained by two successive iterations are consistent to complete clustering.

Further, the classification optimization method for steel grade family of a steel rolling model of the present invention is also characterized in that:

the steps of calculating the shortest distance from any sample $X_i(Km_i, \dot{\varepsilon}_i)$ to each cluster centreline in step 4 are as follows:

1) calculating a distance function $D_{ij}$ from $X_i$ to any point on the $j^{th}$ cluster centre curve $Km_{cenj}=C_j \cdot \dot{\varepsilon}m_j$: $D_{ij}=\sqrt{(Km_i-Km_{cenj})^2+(\dot{\varepsilon}_i-\dot{\varepsilon})^2}$ 2) based on a nonlinear optimized algorithm: searching for a minimum value $minD_{ij}$ of $D_{ij}$ using a Nelder-Mead simplex algorithm, namely the shortest distance from the sample point $X_i$ to the $j^{th}$ cluster centre curve, finding a basic feasible solution firstly to judge whether it is an optimal solution; if not, transforming to another improved superior basic feasible solution according to a predetermined rule, and then identifying; if not, re-transforming, and repeating based on this, wherein since the number of basic feasible solutions is limited, the optimal solution of the problem must be obtained after a finite number of transformations.

Beneficial Effects of the Invention

Based on an accumulated large amount of hot continuous rolling production measured data, the present invention uses cluster analysis to optimize the existing classification of steel grade family, and makes up for the deficiency of the existing division of steel grade family of a steel rolling model. The classification optimization method for steel grade family of a steel rolling model proposed in the present patent has been practically applied to multiple hot continuous rolling new or renovation projects such as Baosteel 1880, Baosteel 1580 and Meigang 1780, which improves the precision of the division of steel grade family of a hot rolled model, thus improving the model setting precision and rolling stability of hot rolled strip, and playing an important role in model debugging and product verification of the hot continuous rolling new or renovation projects.

DESCRIPTION OF THE EMBODIMENTS

Figure 1:
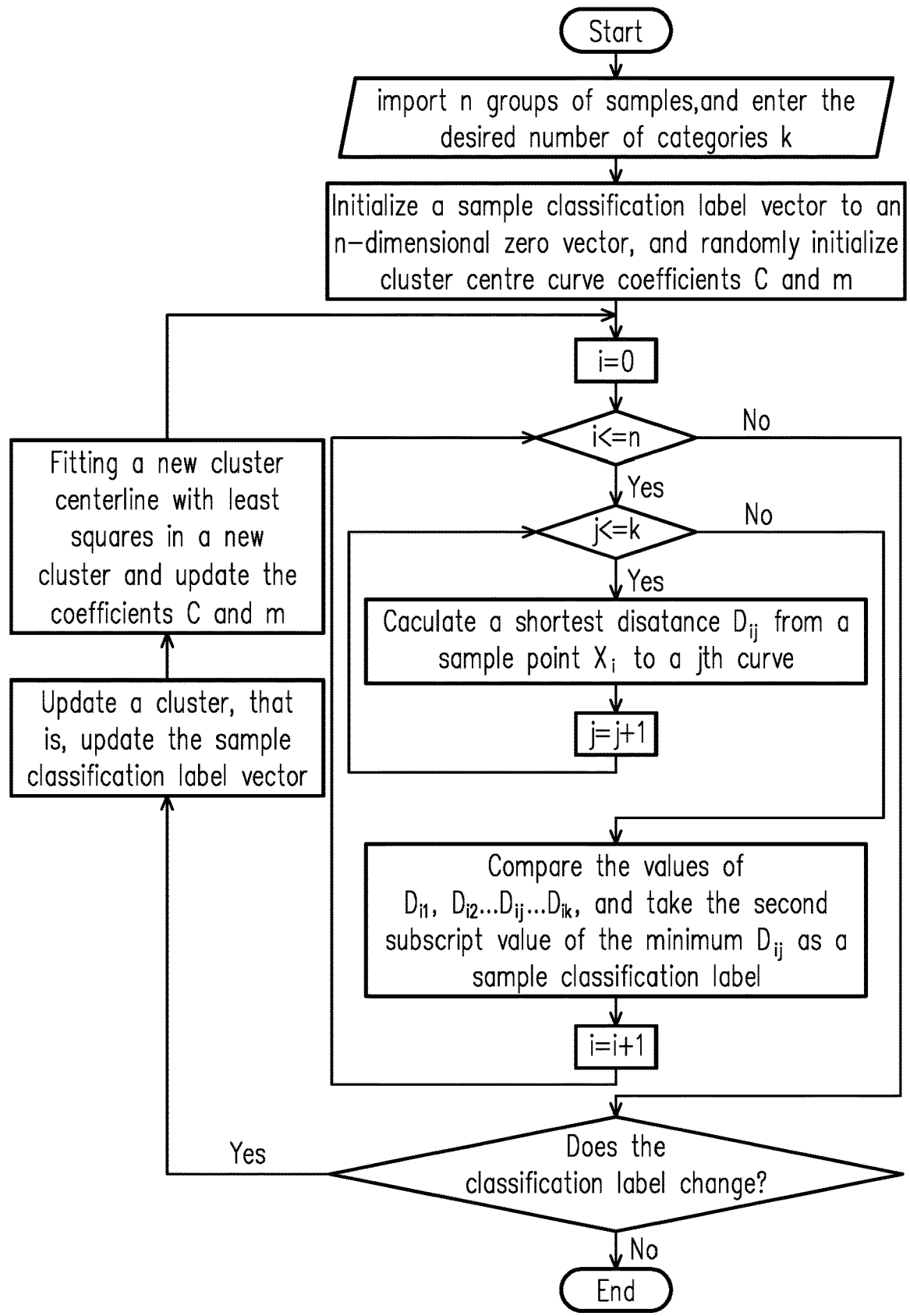
FIG. 1 is a flowchart of a line clustering algorithm according to the present invention.

The embodiments of the present invention are described below with reference to the accompanying drawings.

A classification optimization method for steel grade family of a steel rolling model of the present invention includes the following steps:

Step 1: For each coil of strip in a certain steel grade family, calculate a deformation rate $\dot{\varepsilon}$ and deformation resistance $Km^{POS}$ of a rolled piece according to latest rolling process measured data obtained during model adaptive post-calculation process.

Calculation formulas for the deformation rate are as follows:

$$\varepsilon = \ln\left(\frac{1}{1-r}\right) = \ln\left(\frac{H}{h}\right)$$

$$\dot{\varepsilon} = \frac{\varepsilon \cdot v_R}{\sqrt{R' \cdot (H-h)}}$$

where $\varepsilon$ is the deformation degree of the rolled piece, $\dot{\varepsilon}$ is the deformation rate of the rolled piece, r is a reduction rate of a stand, H and h are the entry thickness and exit thickness of the rolled piece on a stand respectively (calculated according to a mass flow balance equation between stands and the measured strip thickness in the exit of the last stand), $v_R$ is a measured speed of rolls, and R' is a roll flattening radius.

A calculation formula for the deformation resistance is as follows:

$$Km^{POS} = \left(a_0 + \sum_{i=1}^{n} a_i, x_i\right) \cdot \exp\left(\frac{b_1}{T+273}\right) \cdot \varepsilon^{b2} \cdot \dot{\varepsilon}^{b3}$$

where $Km^{POS}$ is the deformation resistance from post calculation, $a_i$ and $b_i$ are model parameters to be determined, T is a rolling deformation temperature, and $x_i$ is the content of each chemical component of strip.

Step 2: For each coil of hot rolled strip, substitute a measurement value of roll force according to roll force model calculation formulas, and reversely obtain the deformation resistance $Km^{ACT}$ of the rolled piece, and the calculation formulas are as follows:

$$Km^{ACT} = \frac{F^{ACT}}{W^{ACT} \cdot L_d^{ACT} \cdot Q_p^{ACT}} + \alpha_b \cdot T_b^{ACT} + \alpha_f \cdot T_f^{ACT}$$

$$L_d^{ACT} = \sqrt{R' \Delta h}$$

$$Q_p^{ACT} = (a_{F1} + a_{F2} \cdot r) + (a_{F3} + a_{F4} \cdot r + a_{F5} \cdot r^2) \cdot \sqrt{\frac{R'}{h}}$$

$$R' = \left(1 + \frac{16 \cdot (1-v^2)}{\pi \cdot E} \cdot \frac{F_{act} \cdot 1000}{W^{ACT} \cdot \Delta h}\right) \cdot R$$

where $Km^{ACT}$ is a "measurement" value of the deformation resistance of the rolled piece, $F^{ACT}$ is a measured roll force, $W^{ACT}$ is a measured strip width, $L_d^{ACT}$ is a roll flattening arc length, $Q_p^{ACT}$ is a stress state coefficient, $T_b^{ACT}$ is a measured backward tension, $T_f^{ACT}$ is a measured forward tension, $\alpha_b$ and $\alpha_f$ of are tension influence coefficients, $\alpha_{Fi}$ is a model parameter, v is a Poisson's coefficient, E is an elasticity modulus, $\Delta h$ is a rolling reduction, and R is a roll original radius.

Step 3: Draw a scatter plot of data ($\dot{\varepsilon}$, $Km^{POS}$) and ($\dot{\varepsilon}$, $Km^{ACT}$) on the same graph, according to strip distribution characteristics of data scatters: if the data scatters are concentrated within a strip-shaped range, the division of steel grade family is more reasonable; if they are scattered into several strip-shaped distributions segmented obviously, the division of steel grade family is unreasonable, and the layer needs to be further subdivided.

Step 4: For the unreasonable division of steel grade family, optimize the existing classification of steel grade family using a new algorithm called line clustering, and determine steel grade code that need to be divided into a new family.

(1) Randomly initialize k curves as cluster centres within the range of a data set. Due to a relationship $Km = C \cdot \dot{\varepsilon}^m$ existed in a deformation resistance data set, randomly initializing k curves refers to randomly selecting k groups of C and m coefficient values.

(2) Calculate the distance from all sample points to the k cluster centrelines $Km_{cenj} = C_j \cdot \dot{\varepsilon}^{m_j}$, for each sample point, find a cluster centreline closest to the sample point, add the sample point into a cluster corresponding to the cluster centreline closest to the sample point, and divide the whole data set into k clusters (subset) after traversing all the sample points.

The steps of calculating the shortest distance from any sample $X_i(Km_i, \dot{\varepsilon}_i)$ to each cluster centreline are as follows:

1) Calculate a distance function $D_{ij}$ from $X_i$ to any point on the $j^{th}$ cluster centre curve $Km_{cenj} = C_j \cdot \dot{\varepsilon}^{m_j}$:

$$D_{ij} = \sqrt{(Km_i - Km_{cenj})^2 + (\dot{\varepsilon}_i - \dot{\varepsilon})^2}$$

2) Search for a minimum value $\min D_{ij}$ of $D_{ij}$ based on a nonlinear optimized algorithm: Nelder-Mead (simplex) algorithm, namely the shortest distance from the sample point $X_i$ to the $j^{th}$ cluster centre curve.

The Nelder-Mead algorithm is a simplex algorithm for finding an extreme value of a multidimensional function. Since no derivation operation is used, it is suitable for an equation with a small number of arguments to find an extreme value. The simplex algorithm adheres to the basic idea of "guaranteeing that each iteration is better than the previous one": finding a basic feasible solution firstly to judge whether it is an optimal solution; if not, transforming to another improved superior basic feasible solution according to a predetermined rule, and then identifying; if still not, re-transforming, and repeating based on this. Since the number of basic feasible solutions is limited, the optimal solution of the problem must be obtained after a finite number of transformations. The distance from a point to a curve is actually the shortest path from the point to the curve, so the Nelder-Mead algorithm may be used to easily find the distance.

(3) Fit power curves to data subsets of the k clusters using a least square method respectively, update the C and m coefficient values to update each cluster centreline, repeat step (2), and stop iterating when the cluster centrelines obtained by two successive iterations are consistent to complete clustering.

Figure 2:
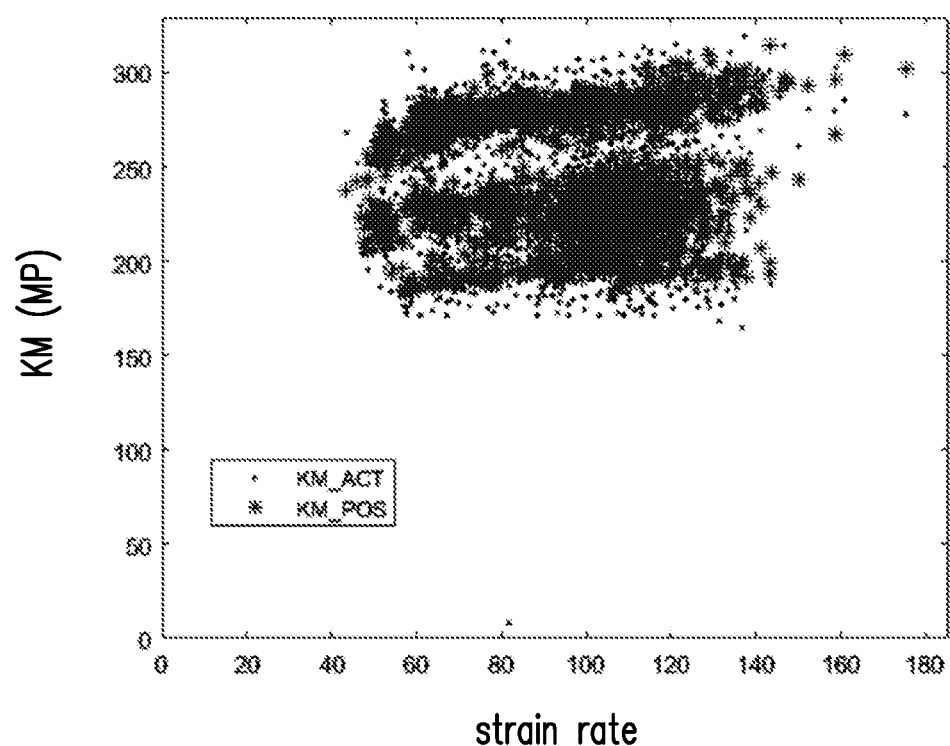
FIG. 2 is the distribution of low-carbon steel deformation resistance of a certain hot continuous rolling mill.

The following is an example of a certain steel grade family of a Baosteel 1880 hot continuous rolling mill. Data of 3000 strips of a steel grade family where low-carbon steel produced by 1880 is located is selected, the code of the steel grade family being set to 1001. The scatter plot shown in FIG. 2 is obtained according to the operation flow from step 1 to step 3. It can be seen from FIG. 2 that the "deformation rate-deformation resistance" data scatter plot has two distribution areas segmented obviously, indicating that there are many categories with obvious differences in the steel grade family and further subdivision of the steel grade family is required.

The following optimizes the classification of model steel grade family using the present patent technology. There is an approximate power function relationship between the deformation resistance and deformation rate of hot rolled strip, the relational expression being:

$$Km = C \cdot \dot{\varepsilon}^m$$

where C and m are parameters to be determined.

According to the analysis, the more concentrated the deformation resistance data ($\dot{\varepsilon}$, $Km^{POS}$) is distributed around the power function curve $Km = C \cdot \dot{\varepsilon}^m$, the better the degree that all the steel grade code in the data set belong to the same steel family. Therefore, the cluster analysis of the data set ($\dot{\varepsilon}$, $Km^{POS}$) can be used to find out the steel grade code that need to be divided into new steel grade family.

Line clustering analysis is performed on the "deformation rate-deformation resistance" data set ($\dot{\varepsilon}$, $Km^{POS}$) of the rolled piece in FIG. 2. The following FIG. 3 and FIG. 4 are the classification cases when the k values are 2 and 3 respectively, that is, the classification cases when the data set is divided into 2 or 3 categories.

Figure 3:
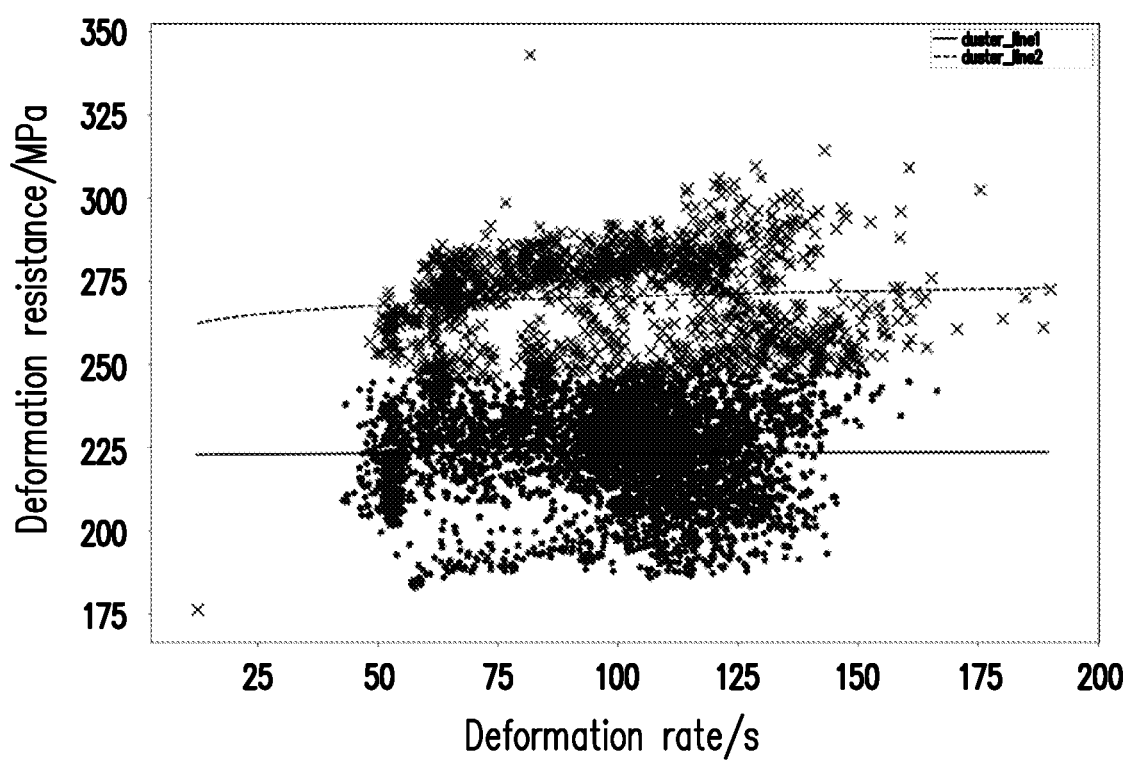
FIG. 3 is a clustering result indicating that the data set is divided into two categories (steel grade families).

As shown in FIG. 3, an original data set is clearly divided into two categories on the graph, "•"-shaped data points are evenly distributed around a clustering curve cluster_line1 in a solid line type: $Km_{cen1} = C_1 \cdot \dot{\varepsilon}^{m_1}$, "x"-shaped data points are evenly distributed around a clustering curve cluster_line2 in a dotted type: $Km_{cen2} = C_2 \cdot \dot{\varepsilon}^{m_2}$, and the distribution of the two types of points has obvious boundaries. When it is divided into two categories, it is iterated for 14 times. The parameters of the cluster centre curve obtained finally are: $C_1 = 222.105$, $m_1 = 0.0019$; $C_2 = 252.807$, $m_2 = 0.0145$.

By further tracking the steel grade codes corresponding to these data points, it is found that the "•"-shaped data points are mainly steel grade codes such as AN0691D1, AP0740D5 and DP0161D1, and the "x"-shaped data points are mainly steel grade codes such as AP1055E5.

Figure 4:
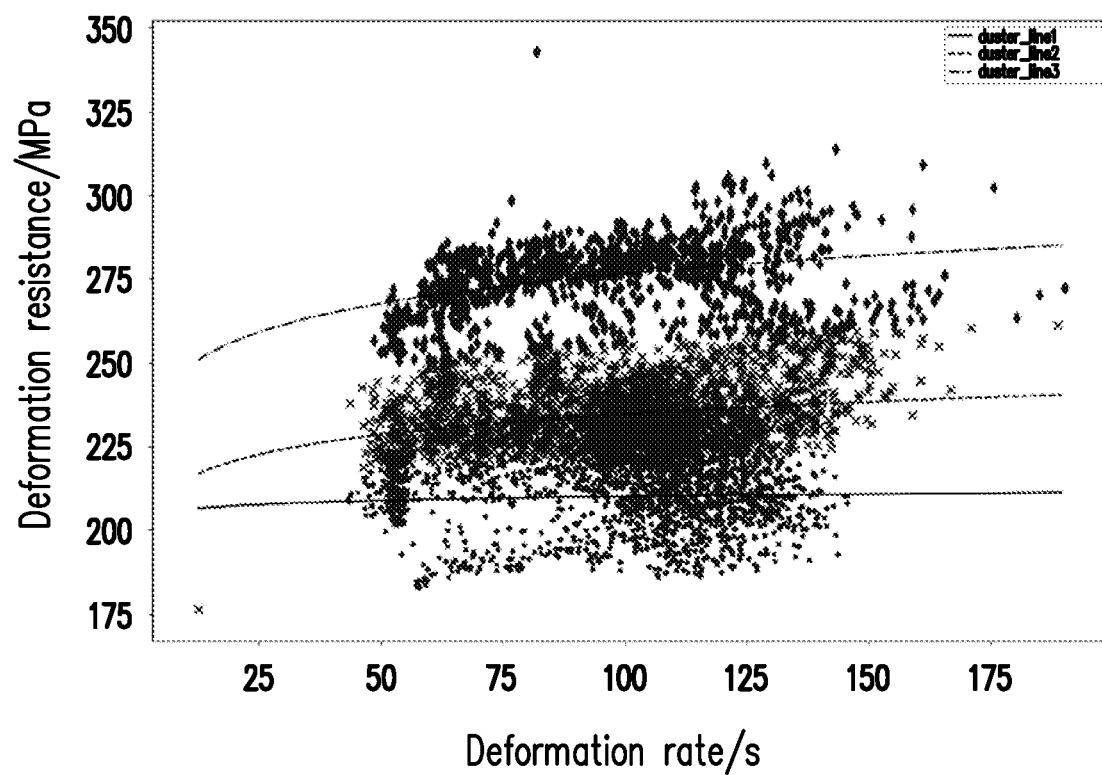
FIG. 4 is a clustering result indicating that the data set is divided into three categories (steel grade families).

As shown in FIG. 4, an original data set is clearly divided into three categories on the graph. "•"-shaped data points are evenly distributed around a clustering curve cluster_line1 in a solid line type: $Km_{cen1} = C_1 \cdot \dot{\varepsilon}^{m_1}$, "x"-shaped data points are evenly distributed around a clustering curve cluster_line2 in a dotted type: $Km_{cen2} = C_2 \cdot \dot{\varepsilon}^{m_2}$, and "♦"-shaped data points are evenly distributed around a clustering curve cluster_line3 in a dash dotted type: $Km_{cen3} = C_3 \cdot \dot{\varepsilon}^{m_3}$. When it is divided into three categories, it is iterated for 24 times. The parameters of the cluster centre curve obtained finally are: $C_1 = 202.178$, $m_1 = 0.0084$; $C_2 = 196.989$, $m_2 = 0.0380$; $C_3 = 222.829$, $m_3 = 0.0470$.

By further tracking the corresponding steel grade code, it is found that the "•"-shaped data points are mainly steel grade codes such as DP0161D1, the "x"-shaped data points are mainly steel grade codes such as AN0691D1, and the "♦"-shaped data points are mainly steel grade codes such as AP1055E5.

The analysis shows that the deformation resistance of AP1055E5 is significantly higher than that of AN0691D1 and DP0161D1 among the steel grade codes AP1055E5, AN0691D1 and DP0161D1 which belong to the original steel grade family, and the deformation resistance of DP0161D1 is slightly lower than that of other steel grades. Therefore, in order to improve the prediction accuracy of a roll force model, AP1055E5 needs to be divided into a new steel grade family; for DP0161D1, because it is not very different from AN0691D1, it can continue to remain in the original family.

The classification optimization method for steel grade family proposed in the present patent has been practically applied to multiple hot continuous rolling projects such as Baosteel 1880, Baosteel 1580 and Meigang 1780, and plays an important role in model debugging, standardization and product verification of hot continuous rolling new or renovation projects.

It is to be noted that the above is only specific embodiments of the present invention. It is apparent that the present invention is not limited to the above embodiments and there are many similar variations accordingly. All modifications that are directly derived or associated by those of ordinary skill in the art from the content disclosed by the present invention are intended to be within the scope of protection of the present invention.

What is claimed is:

1. A classification optimization method for steel grade family of a steel rolling model, characterized by comprising:

step 1: for each coil of strip in steel grade family, calculating a deformation rate $\dot{\varepsilon}$ and deformation resistance $Km^{POS}$ of a rolled piece according to latest rolling process measured data obtained during model adaptive post-calculation process, calculation formulas for the deformation rate being as follows:

$$\varepsilon = \ln\left(\frac{1}{1-r}\right) = \ln\left(\frac{H}{h}\right)$$

$$\dot{\varepsilon} = \frac{\varepsilon \cdot v_R}{\sqrt{R' \cdot (H-h)}}$$

where $\varepsilon$ is the deformation degree of the rolled piece, $\dot{\varepsilon}$ is the deformation rate of the rolled piece, r is a reduction rate of a stand, H and h are the entry thickness and exit thickness of the rolled piece on a stand respectively, $v_R$ is a measured speed of rolls, and R' is a roll flattening radius, a calculation formula for the deformation resistance being as follows:

$$Km^{POS} = \left(a_0 + \sum_{i=1}^{n} a_i, x_i\right) \cdot \exp\left(\frac{b_1}{T+273}\right) \cdot \varepsilon^{b2} \cdot \dot{\varepsilon}^{b3}$$

where $Km^{POS}$ is a calculated value of the deformation resistance of the rolled piece, T is a rolling deformation temperature, $x_i$ is the content of each chemical component of strip, and $a_i$ and $b_i$ are model parameters to be determined;

step 2: for each coil of hot rolled strip, substituting a measurement value of roll force according to roll force model calculation formulas, and reversely obtaining the deformation resistance $Km^{ACT}$ of the rolled piece, the calculation formulas being as follows:

$$Km^{ACT} = \frac{F^{ACT}}{W^{ACT} \cdot L_d^{ACT} \cdot Q_p^{ACT}} + \alpha_b \cdot T_b^{ACT} + \alpha_f \cdot T_f^{ACT}$$

$$L_d^{ACT} = \sqrt{R' \Delta h}$$

$$Q_p^{ACT} = (a_{F1} + a_{F2} \cdot r) + (a_{F3} + a_{F4} \cdot r + a_{F5} \cdot r^2) \cdot \sqrt{\frac{R'}{h}}$$

$$R' = \left(1 + \frac{16 \cdot (1-v^2)}{\pi \cdot E} \cdot \frac{F_{act} \cdot 1000}{W^{ACT} \cdot \Delta h}\right) \cdot R$$

where $Km^{ACT}$ is a "measurement" value of the deformation resistance of the rolled piece, $F^{ACT}$ is a measured roll force, $W^{ACT}$ is a measured strip width, $L_d^{ACT}$ is a roll flattening arc length, $Q_p^{ACT}$ is a stress state coefficient, $T_b^{ACT}$ is a measured backward tension, $T_f^{ACT}$ is a measured forward tension, $\alpha_b$ and $\alpha_f$ are tension influence coefficients, $\alpha_{Fi}$ is a model parameter, v is a Poisson's coefficient, E is an elasticity modulus, $\Delta h$ is a rolling reduction, and R is a roll original radius;

step 3: drawing a scatter plot of data ($\dot{\varepsilon}$, $Km^{POS}$) and ($\dot{\varepsilon}$, $Km^{ACT}$) on the same graph, according to strip distribution characteristics of data scatters: if the data scatters are concentrated within a strip-shaped range, layer division is more reasonable; if they are scattered into several strip-shaped distributions segmented obviously, the layer division is unreasonable, and the layer needs to be further subdivided; and step 4: for the unreasonable division of steel grade family, optimizing the existing classification of steel grade family using a new algorithm called line clustering, and determining steel grade code that need to be divided into a new family;

(1) randomly initializing k curves as cluster centres within the range of a data set, wherein randomly initializing k curves refers to randomly selecting k groups of C and m coefficient values according to a relationship $Km = C \cdot \dot{\varepsilon}^m$ existed in a deformation resistance data set;

(2) calculating the distance from all sample points to the k cluster centrelines $Km_{cenj} = C_j \cdot \dot{\varepsilon}^{mj}$, for each sample point, finding a cluster centreline closest to the sample point, adding the sample point into a cluster corresponding to the cluster centreline closest to the sample point, and dividing the whole data set into k clusters after traversing all the sample points; and (3) fitting power curves to data subsets of the k clusters using a least square method respectively, updating the C and m coefficient values to update all the cluster centrelines, repeating step (2), and stopping iterating when the cluster centrelines obtained by two successive iterations are consistent to complete clustering.

2. The classification optimization method for steel grade family of a steel rolling model of claim 1, characterized in that:

the steps of calculating the shortest distance from any sample $X_i(Km_i, \dot{\varepsilon}_i)$; to each cluster centreline in step 4 are as follows:

1) calculating a distance function $D_{ij}$ from $X_i$ to any point on the $j^{th}$ cluster centre curve $Km_{cenj} = C_j \cdot \dot{\varepsilon}^{mj}$: $D_{ij} = \sqrt{(Km_i - Km_{cenj})^2 + (\dot{\varepsilon}_i - \dot{\varepsilon})^2}$ 2) based on a nonlinear optimized algorithm: searching for a minimum value $minD_{ij}$ of $D_{ij}$ using a Nelder-Mead simplex algorithm, namely the shortest distance from the sample $X_i$ point to the $j^{th}$ cluster centre curve, finding a basic feasible solution firstly to judge whether it is an optimal solution; if not, transforming to another improved superior basic feasible solution according to a predetermined rule, and then identifying; if still not, re-transforming, and repeating based on this, wherein since the number of basic feasible solutions is limited, the optimal solution of the problem must be obtained after a finite number of transformations.

* * * * *